United States Patent
Grant et al.

(10) Patent No.: US 11,281,475 B2
(45) Date of Patent: Mar. 22, 2022

(54) REUSABLE ASSET PERFORMANCE ESTIMATION

(71) Applicant: International Business Machines Corporation, Armonk, NY (US)

(72) Inventors: Robert Huntington Grant, Atlanta, GA (US); Weixin Xu, San Jose, CA (US); Frank Eduardo Chavez, Lima (PE); Zachary A. Silverstein, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 16/535,399

(22) Filed: Aug. 8, 2019

(65) Prior Publication Data
US 2021/0042129 A1   Feb. 11, 2021

(51) Int. Cl.
*G06F 9/445*   (2018.01)
*G06N 20/00*   (2019.01)

(52) U.S. Cl.
CPC ............. *G06F 9/445* (2013.01); *G06N 20/00* (2019.01)

(58) Field of Classification Search
CPC ............. G06F 9/445; G06F 8/36; G06N 20/00
See application file for complete search history.

(56) References Cited

U.S. PATENT DOCUMENTS

| | | |
|---|---|---|
| 7,165,105 B2 | 1/2007 | Reiner et al. |
| 9,600,400 B1 | 3/2017 | McDowell |
| 2009/0259987 A1* | 10/2009 | Bergman .................. G06F 8/36 717/107 |
| 2014/0280880 A1 | 9/2014 | Tellis |
| 2016/0274875 A1 | 9/2016 | Farooqi |
| 2016/0283362 A1* | 9/2016 | Seto ..................... G06F 16/2455 |
| 2018/0024701 A1* | 1/2018 | Sanches ................ G06F 40/166 715/781 |
| 2019/0095945 A1 | 3/2019 | Fabbri |
| 2019/0235984 A1* | 8/2019 | Mathur ............... G06F 11/3447 |

OTHER PUBLICATIONS

Hill, "Machine Learning for Software Resuse," Hewlett-Packard Laboratories, IJCAI'87 Proceedings of the 10th international joint conference on Artificial intelligence—vol. 1, Milan, Italy, Aug. 1987, pp. 338-344.
Lounis et al., "Predicting Quality Attributes via Machine-Learning Algorithms," Université du Québec à Montreal, May 2019, 11 pages.
Siddiqi, "AI & Data Analytics, Finding the Needle in the Haystack," riverbed, Aug. 7, 2018, 6 pages.

\* cited by examiner

*Primary Examiner* — Jennifer N Welch
*Assistant Examiner* — Amy P Hoang
(74) *Attorney, Agent, or Firm* — VanLeeuwen & VanLeeuwen; Christopher M. Pignato

(57) ABSTRACT

An approach is provided in which the approach loads an application page on a display that includes a set of reusable components. The approach collects a set of individual load times in response to loading the application page that indicate an amount of time that each one of the set of reusable components takes to render on the display. The approach matches the set of individual load times to the set of reusable components and provides the set of reusable components with the matched set of individual load times to a developer.

17 Claims, 9 Drawing Sheets

Log 500

Log Line 1 – Button Load Timer Start
....
Log Line 2 – Button Load Timer End
Log Line 3 – Total Load Time Between T1, T2 – 27ms Log Line 4 – Button Load Timer Start
----
Log Line 5 – Button Load Timer End
Log Line 6 – Total Load Time Between T1, T2 – 29ms Log Line 7 – Checkbox Load Timer Start
---
Log Line 8 – Checkbox Load Timer End
Log Line 9 – Total Load Time Between T1, T2 – 42ms Log Line 10 – Database Server Retrieval Start
---
Log Line 11 – Retrieving information from backend----50ms
....
Log Line 12 – Database Server Retrieval End
Log Line 13 – Total Load Time Between T1, T2 – 100ms Log Line 14 – 2 buttons, 1 checkbox, 1 Database Server Retrieval. Avg Button Load Time – 28ms, Avg checkbox Load time – 42ms, Avg Database Server Retrieval time – 100ms. Page overall load time – 210 ms, Page base load time (no artifacts) – 12ms. Artifacts contribute 198/210ms of load time.

Log Line 15 – Information POSTed to server for ingestion into development artifact predicted load time

FIG. 5

REUSABLE ASSET PERFORMANCE ESTIMATION

BACKGROUND

What You See Is What You Get (WYSIWYG) editors allow a developer to edit content (text and graphics) in a form closely resembling its appearance when printed or displayed as a finished product. Before the adoption of WYSIWYG editors, developers were required to view text that appeared in editors using system standard typeface and style with little feedback as to the final product's layout (margins, spacing, etc.). Developers were required to enter special non-printing control codes (e.g., markup code tags) to indicate that text should be in boldface, italics, different typefaces, sizes, etc.

Today, WYSIWYG editors allow a developer to directly manipulate the presentation of an application without having to type or remember names of layout commands. WYSIWYG editors do not edit the application's source code directly, but rather edit the presentation as it will appear in a final version. As such, the developer manipulates the presentation with design components using an editor window instead of manually writing blocks of code. This allows the developer to view an application page very similar to the end result while creating the document or image. In addition, WYSIWG editors fulfill the need to reuse software by allowing developers to drag and drop existing software components (artifacts) into their existing application or into new applications.

BRIEF SUMMARY

According to one embodiment of the present disclosure, an approach is provided in which the approach loads an application page on a display that includes a set of reusable components. The approach collects a set of individual load times in response to loading the application page that indicate an amount of time that each one of the set of reusable components takes to render on the display. The approach matches the set of individual load times to the set of reusable components and provides the set of reusable components with the matched set of individual load times to a developer.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 5 is an exemplary diagram showing a user interface of a log taken by a user client;

DETAILED DESCRIPTION

Figure 1:
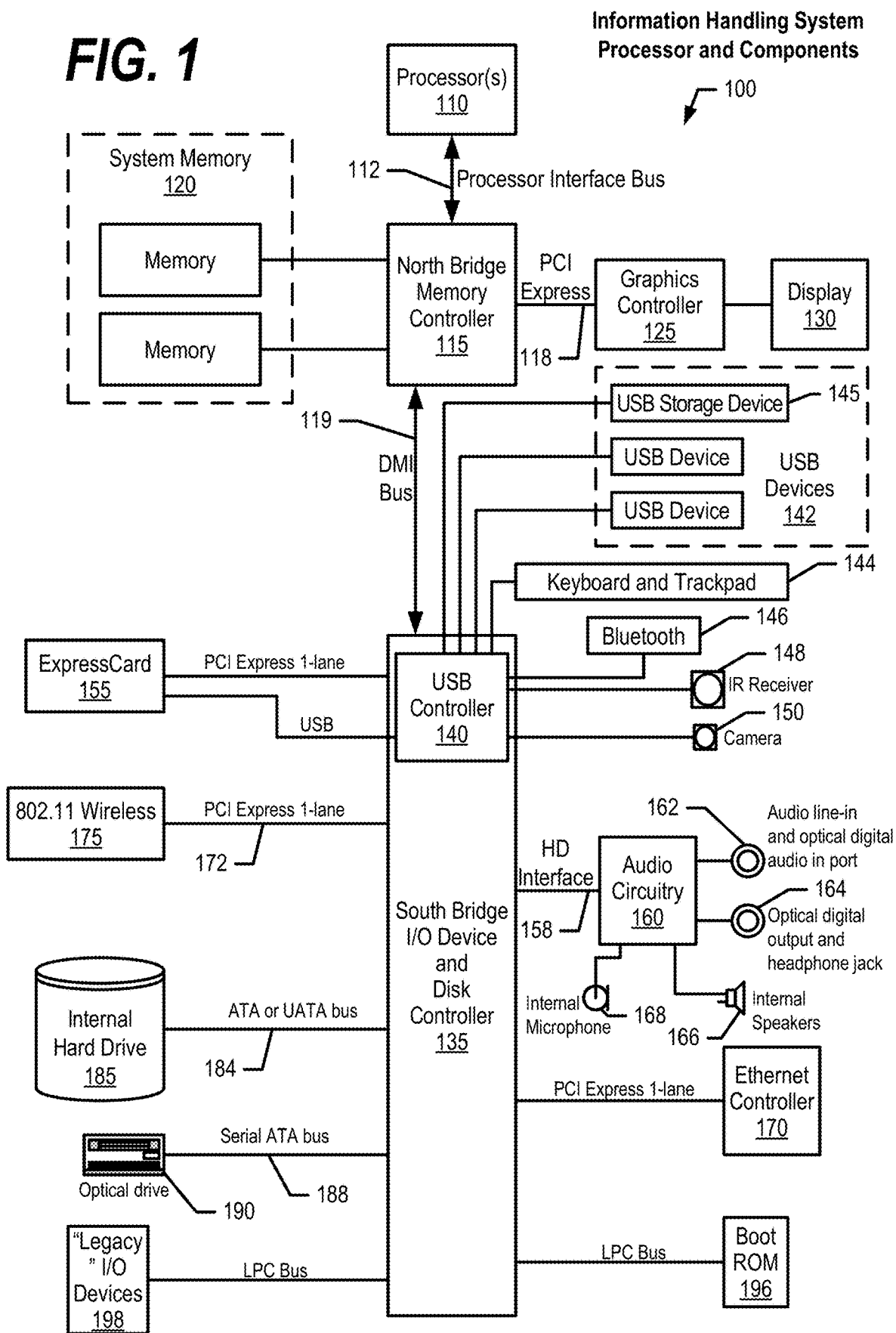
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
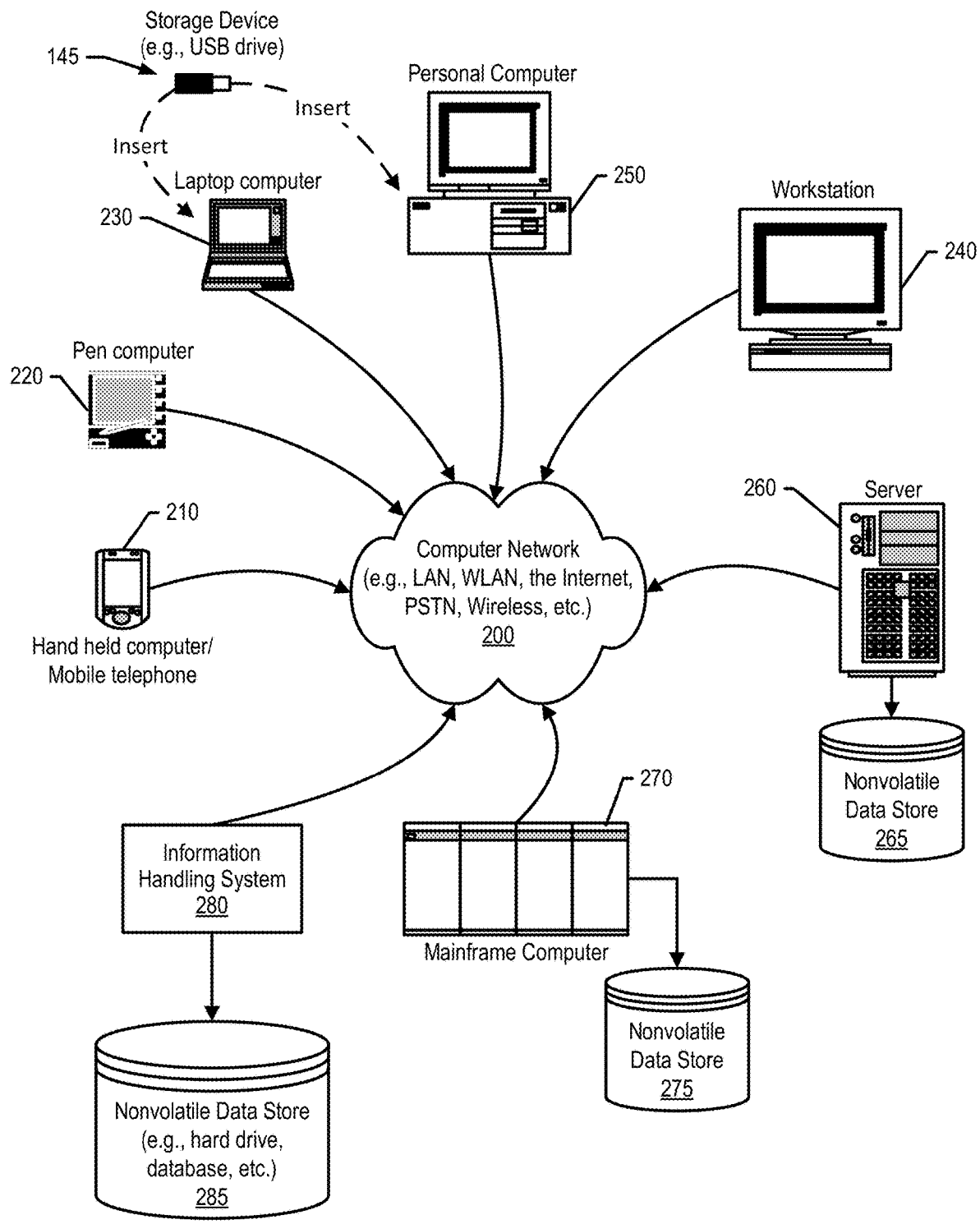
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, WYSIWYG editors allow developers to use existing software components to create applications. However, when these reusable components are used in a layout, a performance decrease exists with rendering each software component when an application page is rendered on a display. By the nature of WYSIWYG editors, many components have unknown behind the scenes behavior (presentation elements, services, and data) for a developer to review. As such, a developer has difficulty in analyzing performance impact of adding a reusable component to page layout, especially in a macro application where application page renderings have significant opportunity to impact performance.

FIGS. 3 through 9 depict an approach that can be executed on an information handling system that isolates performance metrics for WYSIWYG component load times and provides the performance measures in conjunction with the reusable assets to a developer in a WYSIWYG editor. In one embodiment, the approach inputs the performance metrics into a machine learning method (e.g., K-means clustering) to derive average load time associations with each component. In this embodiment, the approach assigns the average load times to the developer so that the developer understands incremental additions of each asset to an application page.

In another embodiment, the approach captures granular performance metrics and segments the component's details to determine frontend loading times (e.g., component rendering) and backend loading times (e.g., accessing a backend server). As a result, this embodiment allows a developer to identify and correct bottlenecks associated with the frontend loading and/or the backend loading.

In another embodiment, the approach applies machine learning to differential iterative application page rendering times of reusable components over multiple environments, users, iterations, etc. In this embodiment, the approach assigns performance values to the reusable components based on the results of the machine learning.

In another embodiment, when a developer develops an enterprise level application with a group of developers, the developer pushes application code to a pre-production environment that is tested by multiple users on multiple clients with different system configurations, browser clients, and network speeds. The clients log a substantial amount of individual load times and corresponding client configuration information, and the approach uses the logs to compute average load times for the reusable components for the various the client configurations and incorporates the average load times for the various client configurations with their corresponding reusable components into a WYSIWYG editor in the team's development environment. In turn, when a different developer develops software code and attempts to use two of the reusable components, the WYSIWYG editor warns the user that using the two selected components together will result in poor performance based on analysis of the prior individual load times.

In another embodiment, when a developer views a screen full of reusable components and wishes to add a series of buttons to the screen, the developer contemplates segmenting the screen into a different format to optimize performance. The developer needs to know if using a "Series of Buttons" reusable component or a "Series of checkboxes" reusable component provides better performance. In this embodiment, the approach informs the developer that a one second load time exists with the Series of Buttons component, and a half second load time exists with the Series of Checkboxes. As such, the developer uses the Series of Checkboxes reusable component to optimize performance.

In another embodiment, when a developer is building a large, enterprise wide application utilizing reusable components, the developer wants to understand how each component affects overall application load time (e.g., how much slower or faster is the page load time when the developer adds a new reusable component). As the developer tests the application, the developer runs a tracking module that logs the performance times of each component application and page width. In turn, when the developer wants to reuse each component, the user can review average load times and estimate overall performance impact.

Figure 3:
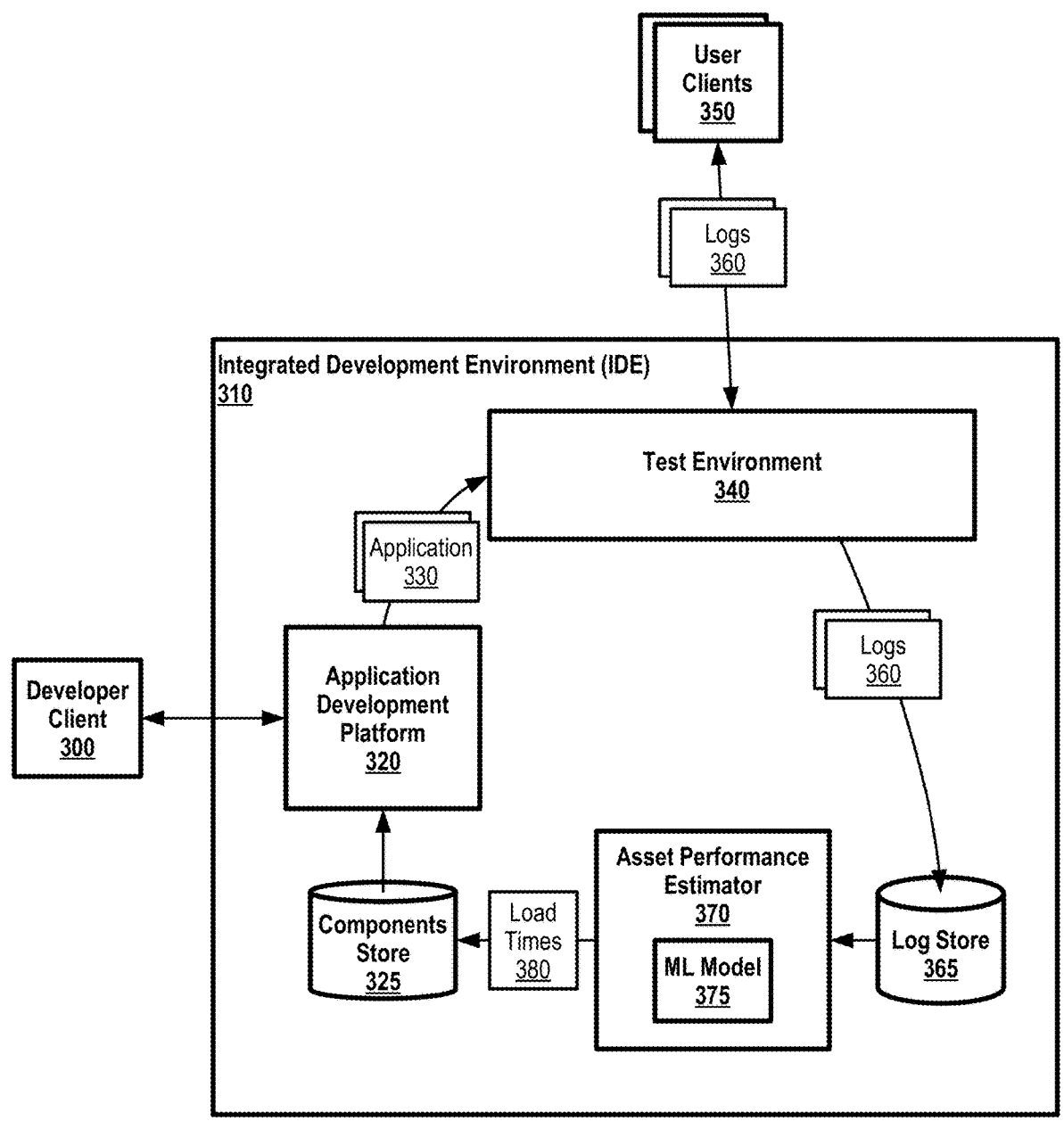
FIG. 3 is an exemplary diagram depicting an asset performance estimator analyzing performance metrics of reusable components and assigning load times to the reusable components for future application development.

FIG. 3 is an exemplary diagram depicting an asset performance estimator analyzing performance metrics of reusable components and assigning individual load times to the reusable components for future application development.

Developer client 300 uses application development platform 320 (e.g., a WYSIWYG editor) within integrated development platform (IDE) 310 to create application 330, which could be an application, a document, a page of data, a web page, etc. Developer client 300 instructs application development platform 320 to use reusable components from components store 325 to create application 330 to reduce the amount of development time. Application development platform 320 retrieves the reusable components from components store 325 and places them within application 330 based on developer client 300's instructions (see FIGS. 4-9, and corresponding text for further details).

When IDE 310 receives application requests from user clients 350, IDE 310 loads instantiations of application 330 onto test environment 340. In one embodiment, user clients 350 operate on multiple different environments with different operating systems, hardware, etc. In another embodiment, test environment 340 is a production environment.

While user clients 350 interact with instantiations of application 330 and pages are loaded (rendered), a tracking module on user clients 350 collects metrics corresponding to the reusable components and stores them in logs 360. Logs 360, in one embodiment, includes information such as (i) object parameters and size; (ii) version of page that is being rendered, (iii) reusable components and quantity in the page; (iv) render times of each reusable component; and (v) browser, processor, and other system information (see FIG. 5 and corresponding text for further details).

In one embodiment, the tracking module is located in test environment 340 to collect the metrics and store them in logs 360. In another embodiment, the tracking module is located on user clients 350 and logs 360 are passed to IDE 310 at various times, such as when user clients 350 are finished interacting with application 330. In yet another embodiment, the tracking module is embedded within application 330 so each instantiation of application 330 includes the tracking module. IDE 310 stores logs 360 in log store 365.

Asset performance estimator 370 retrieves logs 360 from log store 365 and runs machine learning (ML) model 375 on the assorted information. In one embodiment, machine learning model 375 uses K-means clustering to derive an expected performance associated with each individual reusable component. In this embodiment, the K-means clustering returns estimated load times of page, page with light, medium, heavy data derived via segmentation, incremental performance additions, etc.

Asset performance estimator 370 uses the information generated from machine learning model 375 to compute individual expected load times and average load times for the various reusable components utilized in application 330. In one embodiment, asset performance estimator 370 segments components into clusters of other reusable code that matches best at an aggregate level and uses the clusters to compute overall performance estimates of the clusters (see FIG. 6 and corresponding text for further details).

Figure 4:
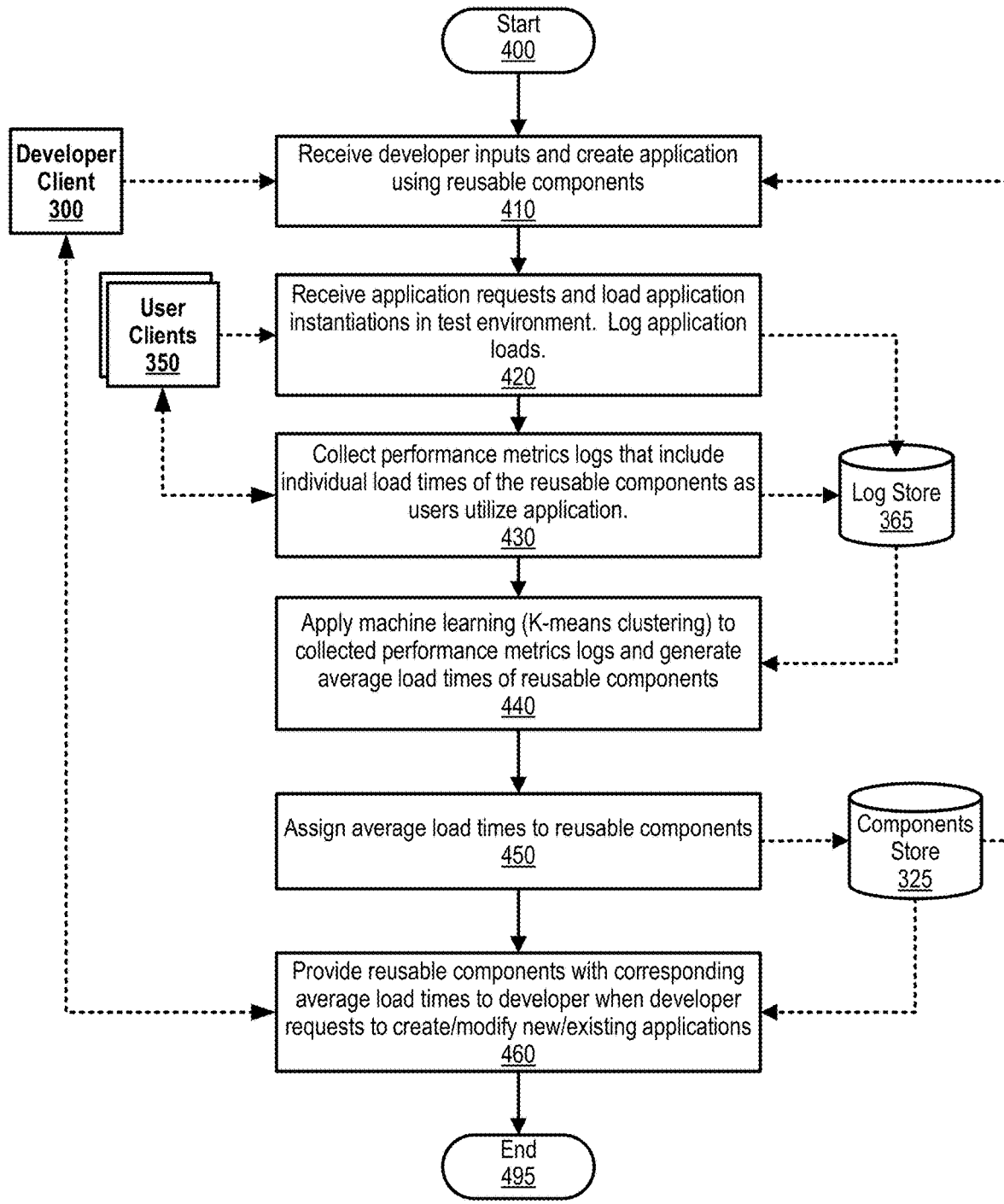
FIG. 4 is an exemplary flowchart showing steps taken to compute load times for reusable components and assign the load times to the reusable components.

Asset performance estimator 370 assigns the computed load times 380 to the various reusable components stored in components store 325 (see FIG. 4 and corresponding text for further details). In turn, application development platform 320 provides the reusable components with their estimate individual load times to developer client 300 or other developers that wish to create new applications or modify existing applications.

In one embodiment, IDE 310 indicates a new application page's performance before the application executes based on results of similar, but different, previous application pages, such as via an aggregation of specific application page median render times.

In another embodiment, IDE 310 uses machine learned clustering to determine whether a complex change is statistically significant, such as changing an endpoint. An endpoint is a reference to a hosting of an application (server, node, cluster, etc.). An endpoint change means a change of an integration path in the application configuration, such as changing the URL of a web service, changing the server, node, cluster, etc. In this embodiment, IDE 310 tracks loading times between different environments and allows IDE 310 to determine whether the average response time will change.

FIG. 4 is an exemplary flowchart showing steps taken to compute individual load times for reusable components and assign the individual load times to the reusable components. FIG. 4 processing commences at 400 whereupon, at step 410, the process receives developer inputs (reusable component selections) from developer client 300 and creates an application using reusable components stored in components store 325. The created application may correspond to an application, a document, a webpage, or any form of data that is usable by a computer system. In one embodiment, instead of waiting to collect individual load times from user clients 350 as discussed herein, the developer invokes the application and a tracking module collects the individual load times of the reusable components. In this embodiment, the process assigns the collected individual load times to the reusable components and presents the individual load times to the developer on developer client 300.

At step 420, the process receives requests from user clients 350 (and/or developer client 300) and loads application instantiations into test environment 340 for user clients 350 to utilize. The process also logs the loads in log store 365 (see FIG. 5 and corresponding text for further details). In one embodiment, the process loads application instantiations into a production environment to gather a wider performance metrics collection sample.

At step 430, the process collects performance metrics logs of the reusable components as user clients 350 utilize the application. The process stores the performance metrics logs in log store 365. For example, the process collects metrics such as (i) object parameters and size; (ii) version of page that is being rendered, (iii) reusable components and quantity of each; (iv) render times of each reusable component; and (v) browser, processor, and other system information.

At step 440, the process applies machine learning (K-means clustering) to the collected performance metrics (machine learning model 375) and generates average individual load times of the reusable components. At step 450, the process assigns the average individual load times to each of the reusable components.

At step 460, when a developer (developer client 300 other developers) requests to create/modify new/existing pages of application, the process provides the reusable components along with their corresponding average individual load times to the developer so that the developer can select those reusable components that optimize the performance of the developer's application (see FIGS. 6-9 and corresponding text for further details). FIG. 4 processing thereafter ends at 495.

FIG. 5 is an exemplary diagram showing a log taken by a user client that includes performance metrics (e.g., component load times). Log 500 shows performance metrics of three reusable components (two buttons and one checkbox) and a backend server database retrieval.

Log lines 1, 2, and 3 correspond to a first button load start time, load end time, and total load time of 27 milliseconds (ms) to load the first button (render the first button on a display), respectively. Log lines 4, 5, and 6 correspond to a second button load start time, load end time, and total load time to load the second button (29 ms), respectively. Log lines 7, 8, and 9 correspond to a checkbox load start time, load end time, and total load time to load the checkbox (42 ms), respectively. Log lines 10, 11, 12, and 13 correspond to retrieving data from a backend server and the amount of taken to retrieve the data (100 ms).

Log line 14 includes a summary of the load times and include an average button load time of 28 ms (average of 27 ms and 29 ms), an overall page load time of 210 ms, a page base load time of 12 ms (overall load time−artifact (component) load times), and the amount of time that the component load times contribute as a whole (198 ms). Log line 15 indicates that the log data is sent to IDE 310 for analysis. In one embodiment, at least a portion of the information in log line 14 is computed by asset performance estimator 370.

Figure 6:
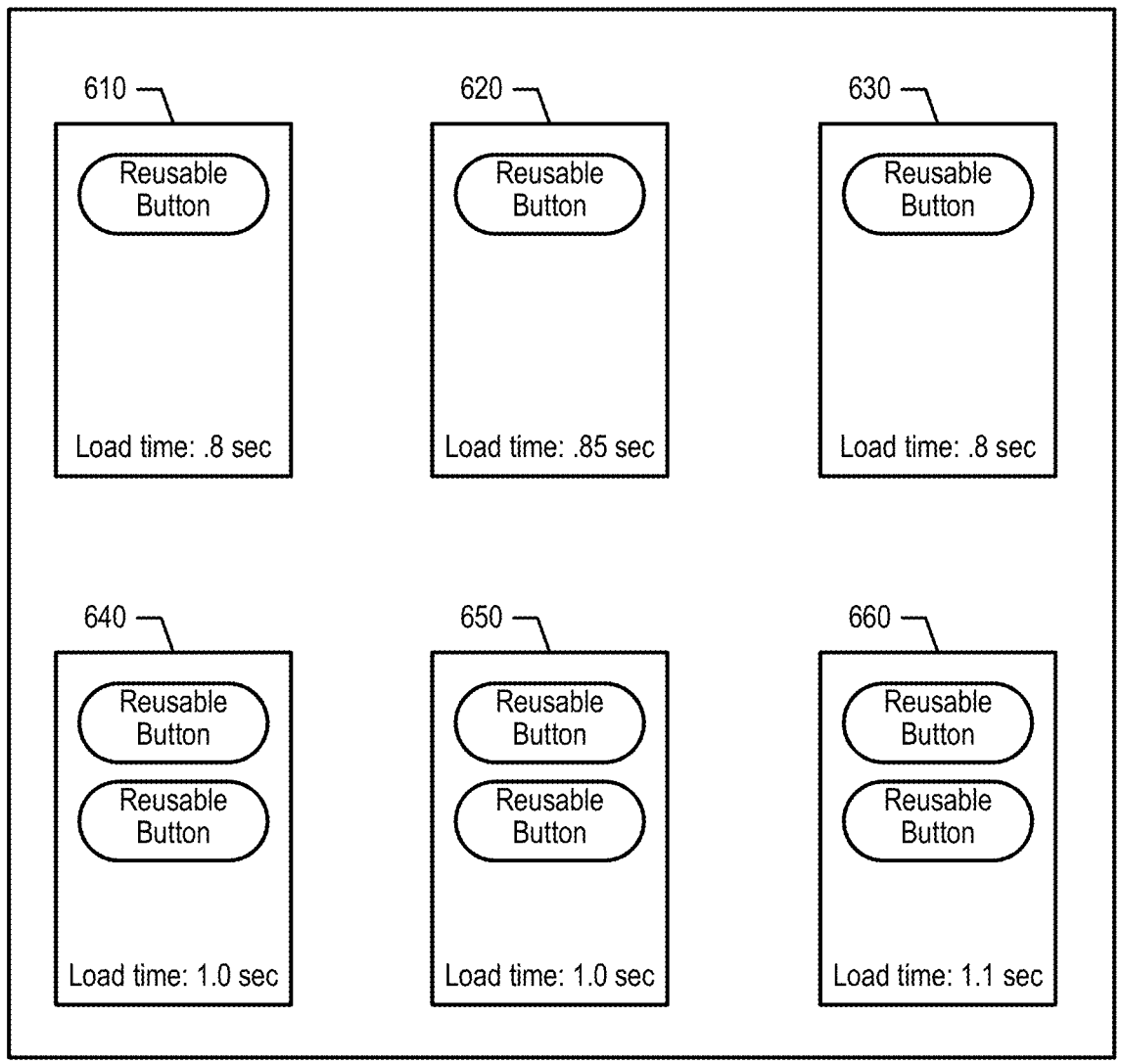
FIG. 6 is an exemplary diagram showing various instantiations of application pages and their overall load times.

FIG. 6 is an exemplary diagram showing various instantiations of application pages and their overall load times. User clients 350 invoke applications that load one or more of the various application pages 610, 620, 630, 640, 650, and 660, which have overall page load times of 0.8 seconds, 0.85 seconds, 0.8 seconds, 1.0 seconds, 1.0 seconds, and 1.1 seconds, respectively.

In one embodiment, machine learning module 375 analyzes the overall page load times and performs the following algebraic computations:

INPUT:
X=button load time on page;
Y=base load time of the page empty page;
x+y=0.8; (page 610)
x+y=0.85; (page 620)
x+y=0.8; (page 630)
2x+y=1.0; (page 640)
2x+y=1.0; (page 650)
2x+y=1.1; (page 660)
OUTPUT:
Base page load time: 0.6 seconds;
Average button load time: 0.2 seconds.

As can be seen above, machine learning module 375 generates formulas for the various overall page load times and calculates base page load times and average button load times using the above formulas. In turn, the base page load times and average button load times are provided to the developer for analysis.

Figure 7:
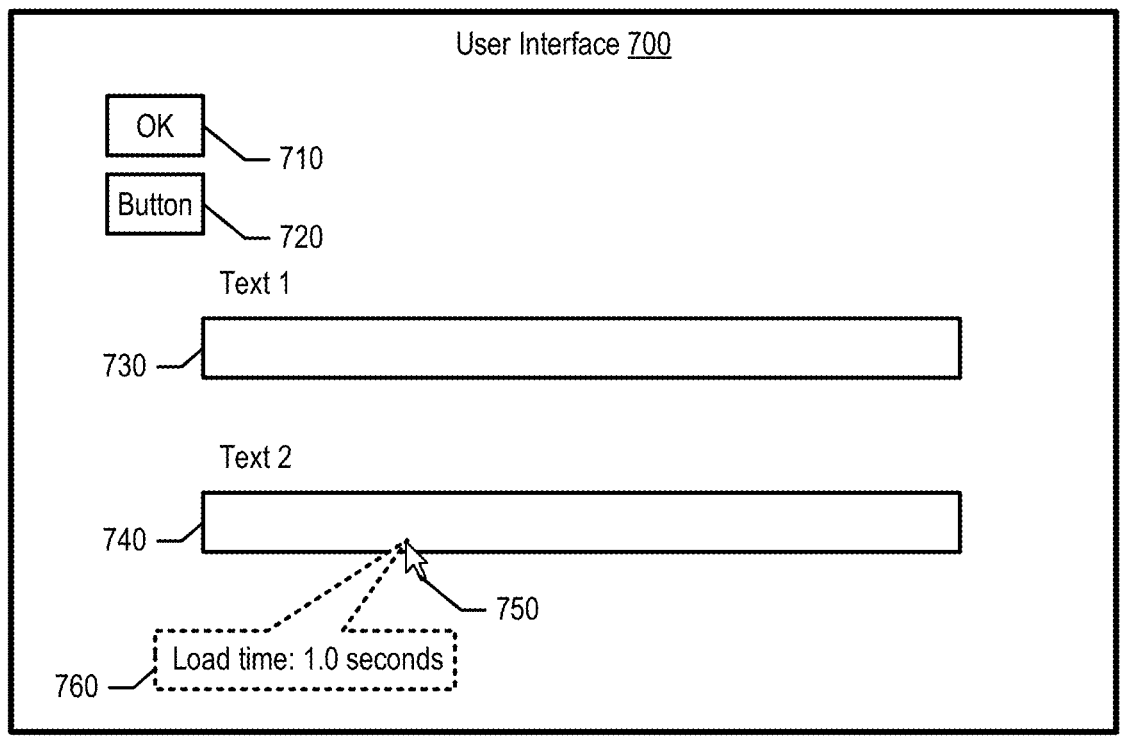
FIG. 7 is an exemplary diagram depicting a user interface that allows a developer to select reusable components to place on an application page.

FIG. 7 is an exemplary diagram depicting a user interface that includes reusable components selected by a developer and placed on an application page layout. User interface 700, in one embodiment, is a representation of a WYSIWYG editor embedded in IDE 310, and each of components 710, 720, 730, and 740 are reusable components. In the embodiment shown, the developer is able to place mouse pointer 750 over one of the reusable components (component 740) and popup 760 appears with the reusable component's estimate individual load time based on the approach discussed herein.

Figure 8:
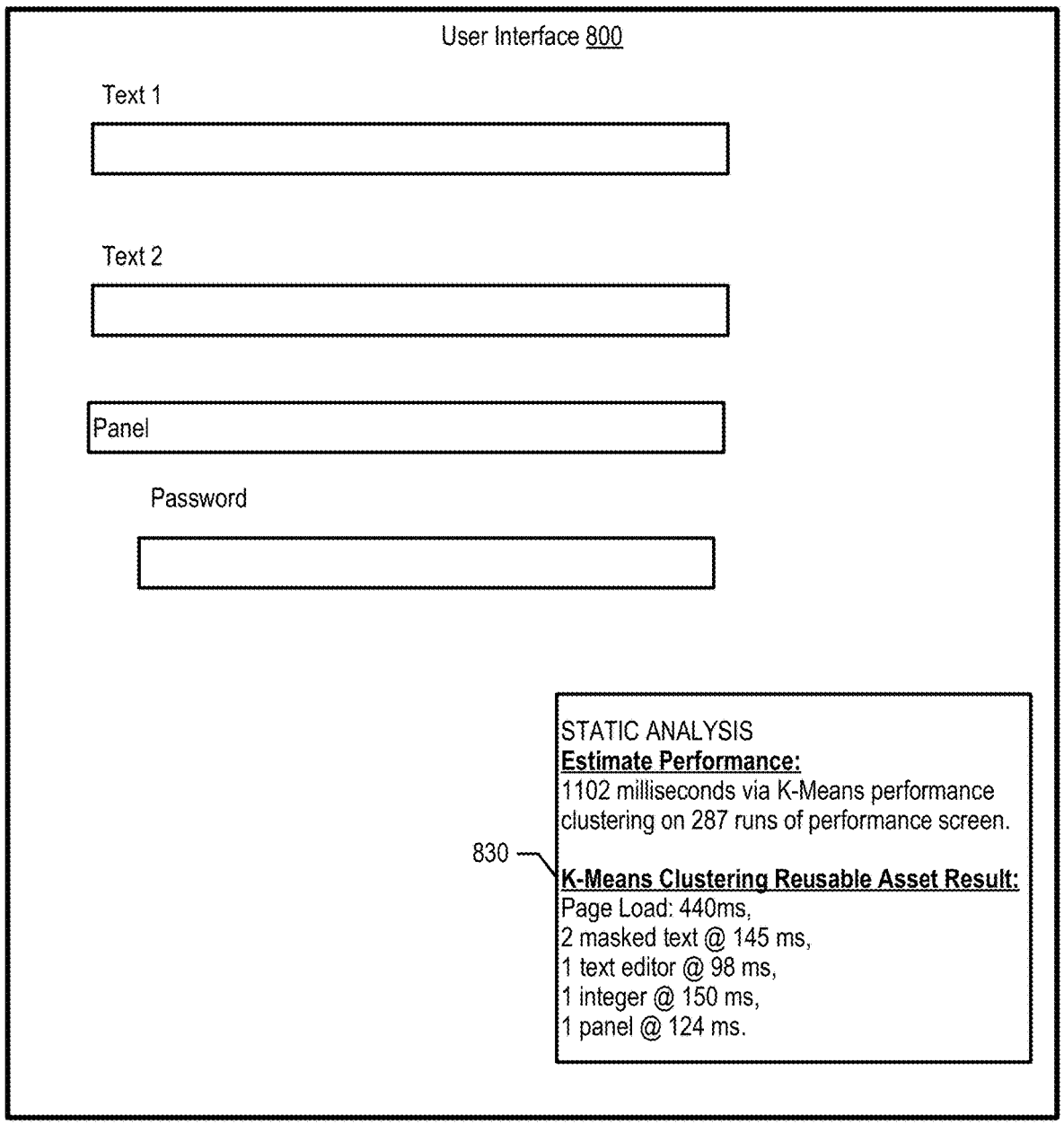
FIG. 8 is an exemplary diagram depicting a user interface that shows page load metrics of an application page.

FIG. 8 is an exemplary diagram depicting a user interface that shows page load metrics of an application page. User interface 800 shows page load metrics 830 that shows that the application page has loaded 287 times with an average overall load time of 1,102 milliseconds. The bottom section of performance metrics 830 breaks down load times of each individual component on the application page:

Base Page Load: 440 ms;
2 masked text @ 145 ms (2*145=290 ms);
1 text editor @ 98 ms;
1 integer @ 150 ms;
1 panel @ 124 ms;
440+290+98+150+124=1102 ms overall page load total.

In one embodiment, asset performance estimator 370 computes page load metrics 830 prior to the page ever being loaded. In this embodiment, asset performance estimator 370 uses historical load times of the reusable components from similar but different application pages to estimate the amount of time each of the reusable components on user interface 800 takes to load on the application page.

Figure 9:
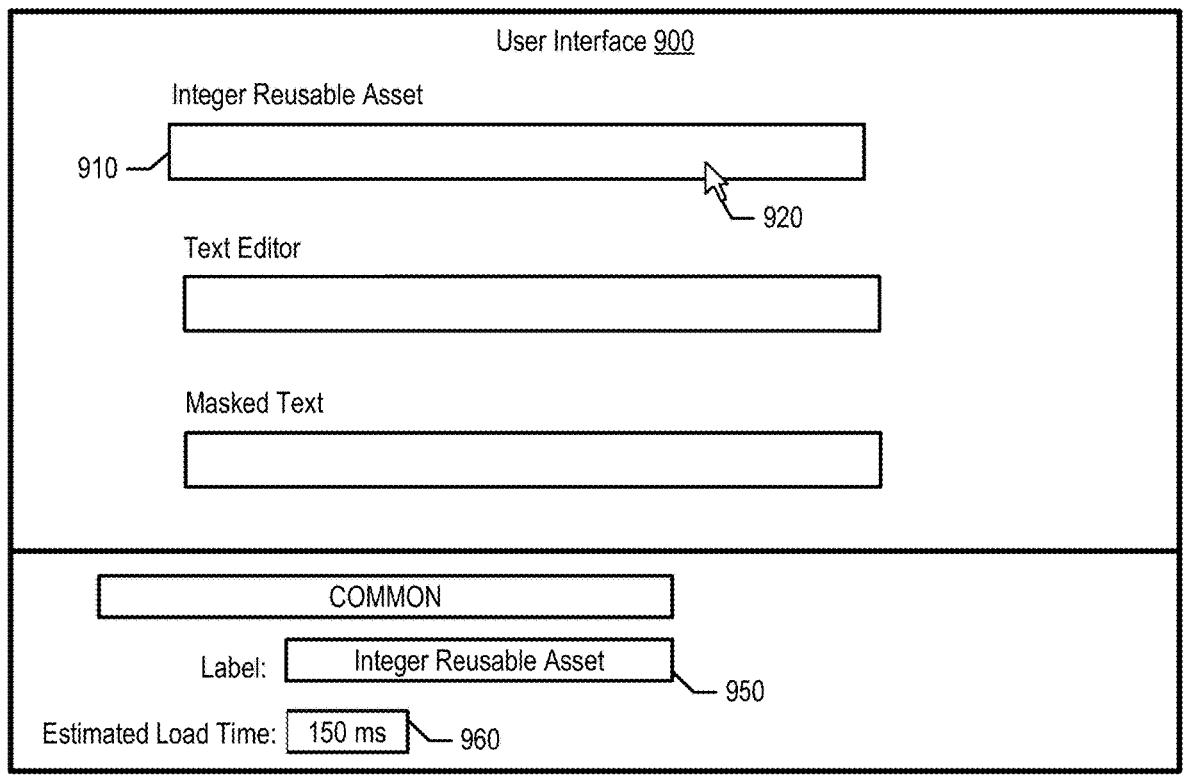
FIG. 9 is an exemplary diagram depicting a user interface that includes reusable components and corresponding load time information.

FIG. 9 is an exemplary diagram depicting a user interface that includes reusable components and corresponding load time information. User interface 900 shows reusable component 910, its corresponding label 950, and its estimated load time 960. As such, when the developer views a user interface with multiple reusable components, the user is able to select a specific reusable component via mouse cursor 920 to view/change the reusable components label (box 950) and view its estimated load time (box 960).

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
loading an application page of an application on a display, wherein the application page comprises a set of reusable components;
collecting a set of individual load times in response to the loading of the application page, wherein each one of the set of individual load times indicate an amount of time that each one of the set of reusable components takes to render on the display;
matching each one of the set of individual load times to at least one of the set of reusable components;
providing the set of reusable components with the matched set of individual load times to a developer;
receiving a set of selections from the developer that select one or more of the set of reusable components to place on a new application page;
creating the new application page, based on the set of selections, that comprise the selected one or more reusable components;
estimating, without loading the new application page, a page load time of the new application page based on the previously collected set of individual load times that correspond to the selected one or more reusable components;
providing the estimate of the page load time to the developer;
receiving a request to load the new application page in response to providing the estimate of the page load time to the developer;
loading the new application page, wherein, during the loading of the new application page, the method further comprises:
collecting a set of frontend load times that indicate an amount of time to render one or more of the set of reusable components on the display, wherein the set of frontend load times is devoid of an amount of time to access a backend server; and
collecting a set of backend load times that indicate the amount of time to access the backend server; and
providing both the set of frontend load times and the set of backend load times to the developer.

2. The method of claim 1 further comprising:
invoking a plurality of instantiations of the application on a plurality of clients in response to receiving a plurality of requests from a plurality of users;
collecting a plurality of the sets of individual load times from the plurality of clients based on the plurality of users using the plurality of instantiations;
computing a set of average individual load times of each one of the set of reusable components based on the plurality of the sets of individual load times;
matching each one of the set of average individual load times to at least one of the set of reusable components; and
providing the set of reusable components and the matched set of average individual load times to the developer.

3. The method of claim 2 further comprising:
estimating the page load time of the new application page based on one or more of the set of average load times.

4. The method of claim 3 further comprising:
determining whether changing one or more endpoints in a computer environment changes the page load time of the new application page; and
changing the one or more endpoints based on the determination.

5. The method of claim 3 wherein the set of reusable components comprise a first reusable component and a second reusable component, the method further comprising:
detecting that the set of selections comprise placing the first reusable component and the second reusable component on the new application page;
determining that utilizing the first reusable component and the second reusable component on the application page results in a degradation in the page load time; and
informing the developer of the degradation in the page load time.

6. The method of claim 1 wherein the set of reusable components comprises a first reusable component and a second reusable component, the method further comprising:
determining that a clustering of the first reusable component with the second reusable component produce and increase in performance compared against the individual load time of the first reusable performance and the individual load time of the second reusable performance; and
presenting the first reusable component with the second reusable component as a cluster to the developer in response to the determination.

7. An information handling system comprising:
one or more processors;
a memory coupled to at least one of the processors;
a set of computer program instructions stored in the memory and executed by at least one of the processors in order to perform actions of:

loading an application page of an application on a display, wherein the application page comprises a set of reusable components;
collecting a set of individual load times in response to the loading of the application page, wherein each one of the set of individual load times indicate an amount of time that each one of the set of reusable components takes to render on the display;
matching each one of the set of individual load times to at least one of the set of reusable components;
providing the set of reusable components with the matched set of individual load times to a developer;
receiving a set of selections from the developer that select one or more of the set of reusable components to place on a new application page;
creating the new application page, based on the set of selections, that comprise the selected one or more reusable components;
estimating, without loading the new application page, a page load time of the new application page based on the previously collected set of individual load times that correspond to the selected one or more reusable components;
providing the estimate of the page load time to the developer;
receiving a request to load the new application page in response to providing the estimate of the page load time to the developer;
loading the new application page, wherein, during the loading of the new application page, the method further comprises:
collecting a set of frontend load times that indicate an amount of time to render one or more of the set of reusable components on the display, wherein the set of frontend load times is devoid of an amount of time to access a backend server; and
collecting a set of backend load times that indicate the amount of time to access the backend server; and
providing both the set of frontend load times and the set of backend load times to the developer.

8. The information handling system of claim 7 wherein the processors perform additional actions comprising:
invoking a plurality of instantiations of the application on a plurality of clients in response to receiving a plurality of requests from a plurality of users;
collecting a plurality of the sets of individual load times from the plurality of clients based on the plurality of users using the plurality of instantiations;
computing a set of average individual load times of each one of the set of reusable components based on the plurality of the sets of individual load times;
matching each one of the set of average individual load times to at least one of the set of reusable components; and
providing the set of reusable components and the matched set of average individual load times to the developer.

9. The information handling system of claim 8 wherein the processors perform additional actions comprising:
estimating the page load time of the new application page based on one or more of the set of average load times.

10. The information handling system of claim 9 wherein the processors perform additional actions comprising:
determining whether changing one or more endpoints in a computer environment changes the page load time of the new application page; and
changing the one or more endpoints based on the determination.

11. The information handling system of claim 9 wherein the set of reusable components comprise a first reusable component and a second reusable component, and wherein the processors perform additional actions comprising:
detecting that the set of selections comprise placing the first reusable component and the second reusable component on the new application page;
determining that utilizing the first reusable component and the second reusable component on the application page results in a degradation in the page load time; and
informing the developer of the degradation in the page load time.

12. The information handling system of claim 7 wherein the set of reusable components comprises a first reusable component and a second reusable component, and wherein the processors perform additional actions comprising:
determining that a clustering of the first reusable component with the second reusable component produce and increase in performance compared against the individual load time of the first reusable performance and the individual load time of the second reusable performance; and
presenting the first reusable component with the second reusable component as a cluster to the developer in response to the determination.

13. A computer program product stored in a computer readable storage medium, comprising computer program code that, when executed by an information handling system, causes the information handling system to perform actions comprising:
loading an application page of an application on a display, wherein the application page comprises a set of reusable components;
collecting a set of individual load times in response to the loading of the application page, wherein each one of the set of individual load times indicate an amount of time that each one of the set of reusable components takes to render on the display;
matching each one of the set of individual load times to at least one of the set of reusable components;
providing the set of reusable components with the matched set of individual load times to a developer;
receiving a set of selections from the developer that select one or more of the set of reusable components to place on a new application page;
creating the new application page, based on the set of selections, that comprise the selected one or more reusable components;
estimating, without loading the new application page, a page load time of the new application page based on the previously collected set of individual load times that correspond to the selected one or more reusable components;
providing the estimate of the page load time to the developer;
receiving a request to load the new application page in response to providing the estimate of the page load time to the developer;
loading the new application page, wherein, during the loading of the new application page, the method further comprises:
collecting a set of frontend load times that indicate an amount of time to render one or more of the set of reusable components on the display, wherein the set of frontend load times is devoid of an amount of time to access a backend server; and collecting a set of backend load times that indicate the amount of time to access the backend server; and providing both the set of frontend load times and the set of backend load times to the developer.

14. The computer program product of claim 13 wherein the information handling system performs further actions comprising:

invoking a plurality of instantiations of the application on a plurality of clients in response to receiving a plurality of requests from a plurality of users;

collecting a plurality of the sets of individual load times from the plurality of clients based on the plurality of users using the plurality of instantiations;

computing a set of average individual load times of each one of the set of reusable components based on the plurality of the sets of individual load times;

matching each one of the set of average individual load times to at least one of the set of reusable components; and providing the set of reusable components and the matched set of average individual load times to the developer.

15. The computer program product of claim 14 wherein the information handling system performs further actions comprising:

estimating the page load time of the new application page based on one or more of the set of average load times.

16. The computer program product of claim 15 wherein the information handling system performs further actions comprising:

determining whether changing one or more endpoints in a computer environment changes the page load time of the new application page; and changing the one or more endpoints based on the determination.

17. The computer program product of claim 15 wherein the set of reusable components comprise a first reusable component and a second reusable component, and wherein the information handling system performs further actions comprising:

detecting that the set of selections comprise placing the first reusable component and the second reusable component on the new application page;

determining that utilizing the first reusable component and the second reusable component on the application page results in a degradation in the page load time; and informing the developer of the degradation in the page load time.

* * * * *